Patented Oct. 23, 1951

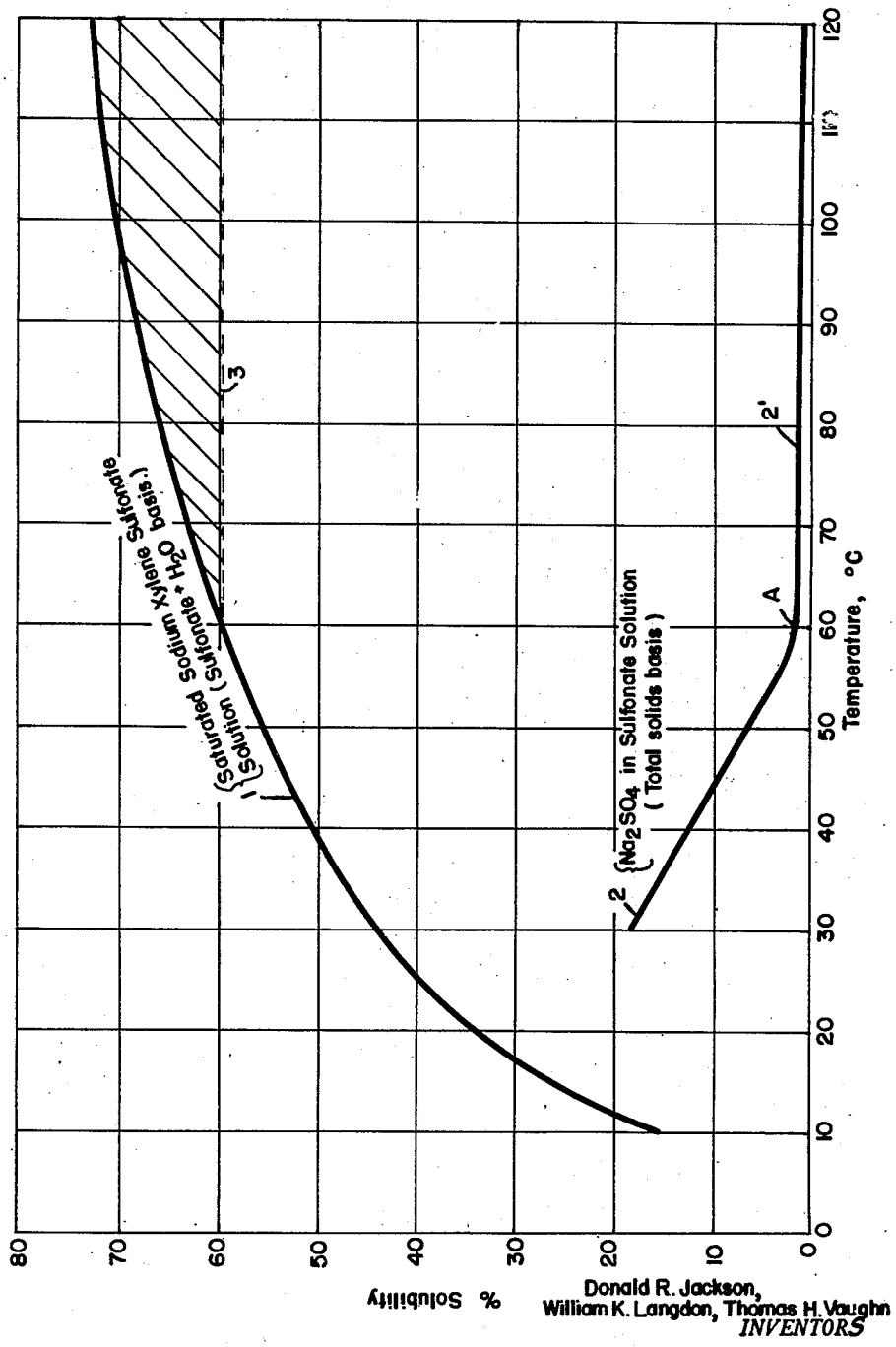

2,572,344

UNITED STATES PATENT OFFICE 2,572,344

REMOVAL OF INORGANIC SULFATES FROM ALKALI METAL BENZENESULFONATE AND ITS HOMOLOGUES

Donald R. Jackson, Wyandotte, and William K. Langdon and Thomas H. Vaughn, Grosse Ile, Mich., assignors to Wyandotte Chemicals Corporation, Wyandotte, Mich., a corporation of Michigan Application March 23, 1949, Serial No. 82,992

7 Claims. (Cl. 260—505)

The purification of the sulfonation products of benzene and of homologues of the benzene series (e. g., toluene, xylene, cymene, etc.) has heretofore presented a difficult problem because of the high content of inorganic sulfate residual in the reaction mass after neutralization of the sulfonic acid and the excess sulfuric acid. Various attempts have been made to solve this problem, over a course of many years. Briefly summarized, these previous attempts can be outlined as follows: (1) neutralization with lime, to precipitate calcium sulfate, followed by metathesis with an alkali metal hydroxide or carbonate to transform the calcium aryl sulfonate to an alkali metal aryl sulfonate (U. S. Patent No. 1,207,798); (2) treatment of the sulfonation mass with NaCl to precipitate out sodium benzenesulfonate, leaving the inorganic sulfate in solution and recovering the purified sodium benzenesulfonate as the filtration residue (U. S. Patent No. 1,396,320); and (3) maintaining the sulfuric acid content of the sulfonation mass at a minimum by reduction of the amount of sulfonating agent (U. S. Patent No. 1,547,186).

Even in the prior art processes (1) and (3) above, the amount of inorganic sulfate contaminant remaining in the aryl sulfonate product, is disclosed as being on the order of 5–15% by weight. (All percentages herein given are by weight.)

On the basis of the principle of the abovementioned U. S. Patent No. 1,396,320, it would normally be expected that an inorganic salt such as $Na_2SO_4$, in an aqueous medium, would salt out the organic sulfonate. Directly contrary to such expectation, however, we have discovered that the organic sulfonate salts out the inorganic sulfate, i. e. the organic sulfonate dissolves in the water in preference to the inorganic sulfate.

In its broader aspect, therefore, our invention comprises the removal of alkali metal sulfates from alkali metal benzenesulfonates and the aliphatically substituted homologues thereof, by preparing a water suspension of the sulfonate-sulfate mixture wherein the sulfonate becomes completely dissolved and a large proportion or substantially all of the sulfate remains undissolved; the organic sulfonate with its $Na_2SO_4$ content reduced then being obtainable in solid form by evaporation or drying.

We have also discovered that in the three-component system consisting of homologous benzenesulfonates, water and inorganic alkali metal sulfate the latter approaches practically complete insolubility when the proportion of dissolved alkali metal benzenesulfonate (and aliphatically substituted homologues thereof) becomes greater than the amount of water present. Since the water solubility of the homologous alkali metal benzenesulfonates increases as the temperature, it is a corollary to these discoveries and our purification process founded upon them, that a sufficient temperature must be maintained in the mixture from which the alkali metal sulfate is separated, to retain such proportion of organic sulfonate in solution.

Examples of the homologous alkali metal benzenesulfonates which can be purified according to the process of our invention are as follows: sodium benzenesulfonate, sodium toluenesulfonate, sodium xylenesulfonate, sodium cymenesulfonate, (sodium methyl benzenesulfonate), (sodium dimethylbenzenesulfonate), (sodium methyl isopropyl benzenesulfonate), and the corresponding potassium, lithium and ammonium compounds.

In the aliphatically substituted homologues, it will be noted that there are a total of 1–4 carbon atoms in such substituent groups.

Our invention utilizes and makes practical application of the above mentioned discoveries in the form of the following described procedures:

A. A solid mixture of the alkali metal benzenesulfonate, or its aliphatically substituted homologues, and a contaminating amount of alkali metal sulfate present is treated with an amount of water sufficient to dissolve the amount of organic sulfonate alone which is present. The organic sulfonate thereby takes up the water in preference to the inorganic sulfate. The undissolved sulfate is then easily removed by filtering or centrifuging. Preferably such treatment is conducted at above room or atmospheric temperature, viz: from 30° C. to the solution boiling point. Such increased temperature treatment in turn increases the water solubility of the organic sulfonate to the further inhibition or detriment of the solubility of the inorganic sulfate.

This procedure A is further illustrated by the following tabulated results which were obtained by treating a solid, dry mixture of approximately 2 parts sodium xylenesulfonate and 1 part sodium sulfate (i. e. of about 33% $Na_2SO_4$ content) with an amount of water sufficient to dissolve all of the sulfonate alone. (A saturated solution of sodium xylenesulfonate solution at room temperature is of about 40% concentration.) Such water treatment was conducted at temperatures of 30° C. and above, thereby preferentially dissolving out the sulfonate, and filtering:

| Sulfonate×100 / (Sulfonate+H₂O) | Temperature, °C. | Per Cent Solids in Filtrate | Per Cent Na₂SO₄ in Filtrate Solids |
|---|---|---|---|
| 39.6 | 30 | 46.6 | 25.8 |
| 39.6 | 40 | 46.2 | 23.5 |
| 39.9 | 50 | 45.8 | 21.4 |
| 40.4 | 60 | 45.9 | 20.1 |
| 40.4 | 75 | 45.4 | 18.4 |
| 40.1 | 85 | 44.8 | 17.6 |
| 40.3 | 95 | 44.9 | 17.2 |
| 43.6 | 34 | 47.9 | 15.7 |
| 46.4 | 50 | 49.0 | 13.5 |
| 46.7 | 75 | 48.7 | 12.4 |
| 46.4 | 97 | 47.7 | 13.4 |
| 52.2 | 48 | 54.5 | 8.9 |
| 62.4 | 64 | 63.0 | 2.5 |

From these results it will be seen that as the factors promoting the water dissolution of greater proportions of sodium xylene sulfonate are increased, the amount of Na₂SO₄ going into solution decreases with a corresponding increase in the amount separated from the original sulfonate-sulfate mixture.

B. The alkali metal benzenesulfonate or an aliphatically substituted homologue thereof, containing a contaminating amount of inorganic sulfate, (on the order of 5–75%, total solids basis) is mixed with water in such proportion that the benzenesulfonate is greater than the amount of water present. The temperature of such mixture is maintained between the minimum required for dissolving the amount of the benzenesulfonate and the boiling point of the solution. Due to the decreased solubility of the inorganic sulfate in such a solution, excess amounts thereof, remain undissolved and are separated by a suitable removal process such as by way of filtration or centrifuging. Preferably this purification process is conducted at a concentration of 60 parts and greater of the organic sulfonate per 100 parts of sulfonate and water because the solubility of the inorganic sulfate in the sulfonate solution is sharply and distinctly decreased at such a critical concentration limit. The corresponding preferred temperature range for such organic sulfonate concentrations is 60–115° C.

C. Our purification process is also performed by evaporating an organic sulfonate-inorganic sulfate-water mixture to increase the sulfonate content to above the water content, and separating the undissolved inorganic sulfate at a temperature sufficiently high to maintain the organic sulfonate in solution.

D. The process of our invention is also performed as a part of the over-all process for synthesizing alkali metal benzenesulfonate and its homologues. This particular form of practice of our process is of special advantage in that it permits the use of a substantial excess of sulfonating agent, such as sulfuric acid or oleum, thus contributing to a high yield and rapidity of the sulfonation reaction. The sulfonation reaction mass, containing the sulfonic and sulfuric acids, is then neutralized with a neutralizing agent such as caustic soda. The amount of water present in the neutralized sulfonation mass is controlled by the amount present in the neutralizing agent solution, by the amount which may be added by way of drowning the sulfonation mass, or by the amount which may be removed by evaporation or distillation. This amount of water is adjusted to within a maximum corresponding to less than the amount of organic sulfonate present. Preferably, the neutralization is conducted at temperatures of 60–115° C., whereby the heat of neutralization may be utilized and the operation conducted in the temperature range wherein the organic sulfonate is maintained in solution. The neutralized reaction mass is then filtered at the elevated temperature range whereby the precipitated and undissolved inorganic sulfate is removed.

As a result of our above described process, it is possible to remove the contaminating inorganic sulfate to an amount of less than 1% by weight on the total solids content basis. In any event, our process makes it possible to purify alkali metal benzenesulfonate and homologues thereof, by the removal of inorganic sulfate, to an extent greater than that heretofore achieved in the art (by other than liming treatment), and by the elimination of the more costly, more complicated and greater time-consuming treatments and processes heretofore known.

The following specific examples illustrate in detail the manner in which the foregoing procedures may be carried out:

EXAMPLE 1

*Sodium benzenesulfonate*

A mixture containing 900 grams of sodium benzenesulfonate, 538 grams of sodium sulfate and 1148 grams of water (weight ratio of sodium benzenesulfonate to water=44:56) was stirred and heated at 95° C. in order to obtain solubility equilibrium. After the mixture had been filtered at 95° C. and analysis of the filtrate indicated that the total solids contained 6.7% of sodium sulfate. The filtrate was further concentrated until the weight ratio of sodium benzenesulfonate to water was 50:50 and it was again filtered at 95° C. An analysis of the filtrate showed that the total solids contained 3.8% of sodium sulfate. Thus, the Na₂SO₄ content of the original mixture was reduced from 37% to 3.8%, total solids basis.

EXAMPLE 2

*Sodium toluenesulfonate*

Toluene was sulfonated with an excess of 98% sulfuric acid at a final temperature of 100° C. When the reaction was completed the sulfonation mass was neutralized with 50% caustic soda and filtered at 90° C. The calculated ratio of sodium toluenesulfonate to water in this mixture was 58 : 42. An analysis of the filtrate showed that the total solids contained 2.2% of sodium sulfate.

EXAMPLE 3

*Sodium toluenesulfonate*

Five moles of toluene was sulfonated with 7.6 moles of 98% sulfuric acid. The sulfonation mass was heated at 100° C. for two hours after the acid had been added to the toluene. After drowning the sulfonation mass in water it was neutralized with 50% caustic soda and filtered at 90° C. The calculated ratio of sodium toluenesulfonate to water in this mixture was 45 : 55 and it is estimated that about three fourths of the sodium sulfate present was removed in this filtration. The filtrate was then concentrated by evaporation of water until it contained 60 parts of sodium toluenesulfonate per 40 parts of water. This concentrate was then filtered at 90° C. and analysis of the filtrate showed that the total solids contained 2.25% of sodium sulfate.

EXAMPLE 4

Sodium xylenesulfonate

Xylene or dimethylbenzene, of a commercially pure grade (consisting essentially of metaxylene and containing lesser amounts of the ortho- and para isomers) in the amount of 318 grams, or 3 mols, was placed in a 1-liter 3-necked flask equipped with an addition funnel, mechanical stirrer, reflux condenser and thermometer. The flask was heated with an electric heating mantle. Sulfuric acid (98% concentration) in the amount of 456 grams (4.5 mols or a 50% excess of the chemically equivalent amount required to react with the xylene) was added over an 8-minute period during which the temperature rose from 20 to 100° C. After the addition of the sulfuric acid, the temperature was maintained in the range of 98-105° C. for one hour. The resultant sulfonation mass was then transferred to a separatory funnel and allowed to stand over night. One portion of the sulfonation mass was neutralized with 50% caustic soda at a temperature of 90-115° C. The precipitated $Na_2SO_4$ was then removed by filtration at about 80° C. The analysis of the filtrate was found to be 59.7% of solids and 0.52% $Na_2SO_4$, equivalent to 0.86% total solids basis. A second portion of this sulfonation mass was similarly neutralized and filtered, but at a lower temperature of approximately 60° C. The analysis of this latter filtrate was found to be 60.3% total solids of which there was 1.77% $Na_2SO_4$.

EXAMPLE 5

Sodium xylenesulfonate

Xylene in the amount of 530 pounds and 98% sulfuric acid in the amount of 760 pounds were charged into a sulfonator and reacted for one hour at 100° C. The entire sulfonation mass, after cooling, was drowned in 1000 pounds of water and neutralized to a pH of about 8.0 with 50% caustic soda solution. The material was then filtered under reduced pressure through canvas using a filter aid, at a temperature of 85-90° C. After filtration, the filtrate was concentrated by distillation to a content corresponding to approximately 60% of sodium xylenesulfonate. The precipitated sodium sulfate was then separated by filtration through a filter press at a temperature of 95° C. The filtrate was adjusted with water to make an approximately 40% sodium xylenesulfonate solution which, on analysis was found to contain only 0.60% $Na_2SO_4$, equivalent to 1.4% total solids basis.

EXAMPLE 6

Sodium p-cymenesulfonate

Five moles of p-cymene was sulfonated with 5% oleum containing the equivalent of 10 moles of $SO_3$. After drowning the sulfonation mass in water and neutralizing with 50% caustic soda, it was calculated that the ratio of sodium cymenesulfonate to water was 45 : 55. When this mixture was filtered at 95° C. an analysis of the filtrate showed that the total solids in the filtrate contained 12.6% of sodium sulfate. The filtrate was further concentrated to a sulfonate-water ratio of 60 : 40 and again filtered at 95° C. Analysis of the filtrate showed that the total solids contained 3.5% of sodium sulfate.

In the foregoing examples the original organic sulfonate product was contaminated with $Na_2SO_4$ on the order of 33⅓%, total solids basis. By our process the $Na_2SO_4$ was reduced to less than 1%, and at the most not over 4%.

The figure in the annexed drawing is a chart which further illustrates this unusual solubility property of sodium sulfate in homologous benzenesulfonate aqueous solutions, and the principle upon which our invention is based. In the case of the curves shown in this chart, the specific aromatic sulfonate employed is sodium xylenesulfonate. Corresponding values and curves for the other benzenesulfonate homologues so closely parallel those given in the chart that it is not believed necessary to here duplicate them.

The curve 1 in the chart, represents the solubility (in terms of parts of organic sulfonate per 100 parts of organic sulfonate and water) of a saturated aqueous solution of pure sodium xylenesulfonate with varying temperatures.

The curve 2 represents the solubility of $Na_2SO_4$ (total solids content basis) in saturated sodium xylenesulfonate solutions. It will be seen that as the amount of sodium xylenesulfonate in solution becomes greater than 50%, or greater than the amount of water present, the solubility of $Na_2SO_4$ therein becomes less than 5%. At the point A corresponding to a 60% sodium xylenesulfonate content solution (at 60° C.), the curve 2 reaches a value of less than 2% $Na_2SO_4$ content. The remainder of the curve to the right of the point A and marked 2', represents the $Na_2SO_4$ content of 60% sodium xylenesulfonate solutions (less than saturated) at temperatures above 60° C. The dotted straight line 3 denotes such 60% sodium xylenesulfonate solutions. Our process is operable at sodium xylenesulfonate concentrations above those represented by the line 3 to produce even higher degrees of $Na_2SO_4$ separation (i. e. lower $Na_2SO_4$ content of solutions) than represented by the curve 2'. Thus the shaded zone of the chart demarks the practical operating ranges of organic sulfonate concentration and of temperature for purifying such compounds contaminated with alkali metal sulfates, to the extent of less than 2% sulfate content.

Other modes of applying the principle of our invention may be employed, changes being made as regards to the details described, provided the features stated in any of the following claims or the equivalent of such be employed.

We, therefore, particularly point out and distinctly claim as our invention:

1. The method of removing alkali metal sulfate from a compound selected from the group consisting of an alkali metal benezenesulfonate and aliphatically substituted homologues thereof wherein the said aliphatic groups comprise a total of 1-4 carbon atoms, which comprises forming an aqueous mixture of these salts with sufficient water to dissolve all of the sulfonate, the amount of sulfonate in said mixture being greater than the amount by weight of water, maintaining the temperature of this mixture between that which is required to dissolve all of the sulfonate and the boiling point of the solution, and separating the resultant solution from the undissolved inorganic sulfate.

2. The method of removing sodium sulfate from a compound selected from the group consisting of a sodium benezenesulfonate and aliphatically substituted homologues thereof wherein the said aliphatic groups comprise a total of 1-4 carbon atoms, which comprises forming an aqueous mixture of these salts with sufficient water to dissolve all of the sulfonate, the amount of sulfonate in said mixture being greater than the amount by weight of water, maintaining the temperature of this mixture between that which is required to dissolve all of the sulfonate and the boiling point of the solution, and separating the resultant solution from the undissolved inorganic sulfate.

3. The method of removing sodium sulfate from sodium xylenesulfonate, which comprises forming an aqueous mixture of these salts with sufficient water to dissolve all of the sulfonate, the amount of sulfonate in said mixture being greater than the amount by weight of water, maintaining the temperature of this mixture between that which is required to dissolve all of the sulfonate and the boiling point of the solution, and separating the resultant solution from the undissolved inorganic sulfate.

4. The method of removing sodium sulfate from sodium toluenesulfonate, which comprises forming an aqueous mixture of these salts with sufficient water to dissolve all of the sulfonate, the amount of sulfonate in said mixture being greater than the amount by weight of water, maintaining the temperature of this mixture between that which is required to dissolve all of the sulfonate and the boiling point of the solution, and separating the resultant solution from the undissolved inorganic sulfate.

5. The method of removing sodium sulfate from sodium benzenesulfonate, which comprises forming an aqueous mixture of these salts with sufficient water to dissolve all of the sulfonate, the amount of sulfonate in said mixture being greater than the amount by weight of water, maintaining the temperature of this mixture between that which is required to dissolve all of the sulfonate and the boiling point of the solution, and separating the resultant solution from the undissolved inorganic sulfate.

6. The method of removing sodium sulfate from a compound selected from the group consisting of sodium benzenesulfonate and aliphatically substituted homologues thereof wherein said aliphatic groups comprise from 1–4 carbon atoms, which comprises forming an aqueous mixture of these salts with sufficient water to dissolve all of the sulfonate, the amount of water being such that the ratio of $$\frac{\text{sulfonate} \times 100\%}{\text{sulfonate} + H_2O}$$

is at least 60%, maintaining the temperature of this mixture between 60°–95° C., and separating the resultant solution from the undissolved inorganic sulfate.

7. The method of removing sodium sulfate from sodium xylenesulfonate, which comprises forming an aqueous mixture of these salts with sufficient water to dissolve all of the sulfonate, the amount of water being such that the ratio of $$\frac{\text{sulfonate} \times 100\%}{\text{sulfonate} + H_2O}$$

is at least 60%, maintaining the temperature of this mixture between 60°–95° C., and separating the resultant solution from the undissolved inorganic sulfate.

DONALD R. JACKSON.
WILLIAM K. LANGDON.
THOMAS H. VAUGHN.

REFERENCES CITED

The following references are of record in the file of this patent:

UNITED STATES PATENTS

| Number | Name | Date |
|---|---|---|
| 2,007,327 | Carr | July 9, 1935 |
| 2,448,184 | Lemmon | Aug. 31, 1948 |

FOREIGN PATENTS

| Number | Country | Date |
|---|---|---|
| 24,826 | Great Britain | June 13, 1907 |
| 116,934 | Great Britain | July 2, 1918 |